No. 867,289. PATENTED OCT. 1, 1907.
N. McCONNELL.
WATER COOLED VALVE.
APPLICATION FILED APR. 20, 1907.

3 SHEETS—SHEET 1.

WITNESSES
INVENTOR

No. 867,289. PATENTED OCT. 1, 1907.
N. McCONNELL.
WATER COOLED VALVE.
APPLICATION FILED APR. 20, 1907.

3 SHEETS—SHEET 2.

WITNESSES
INVENTOR

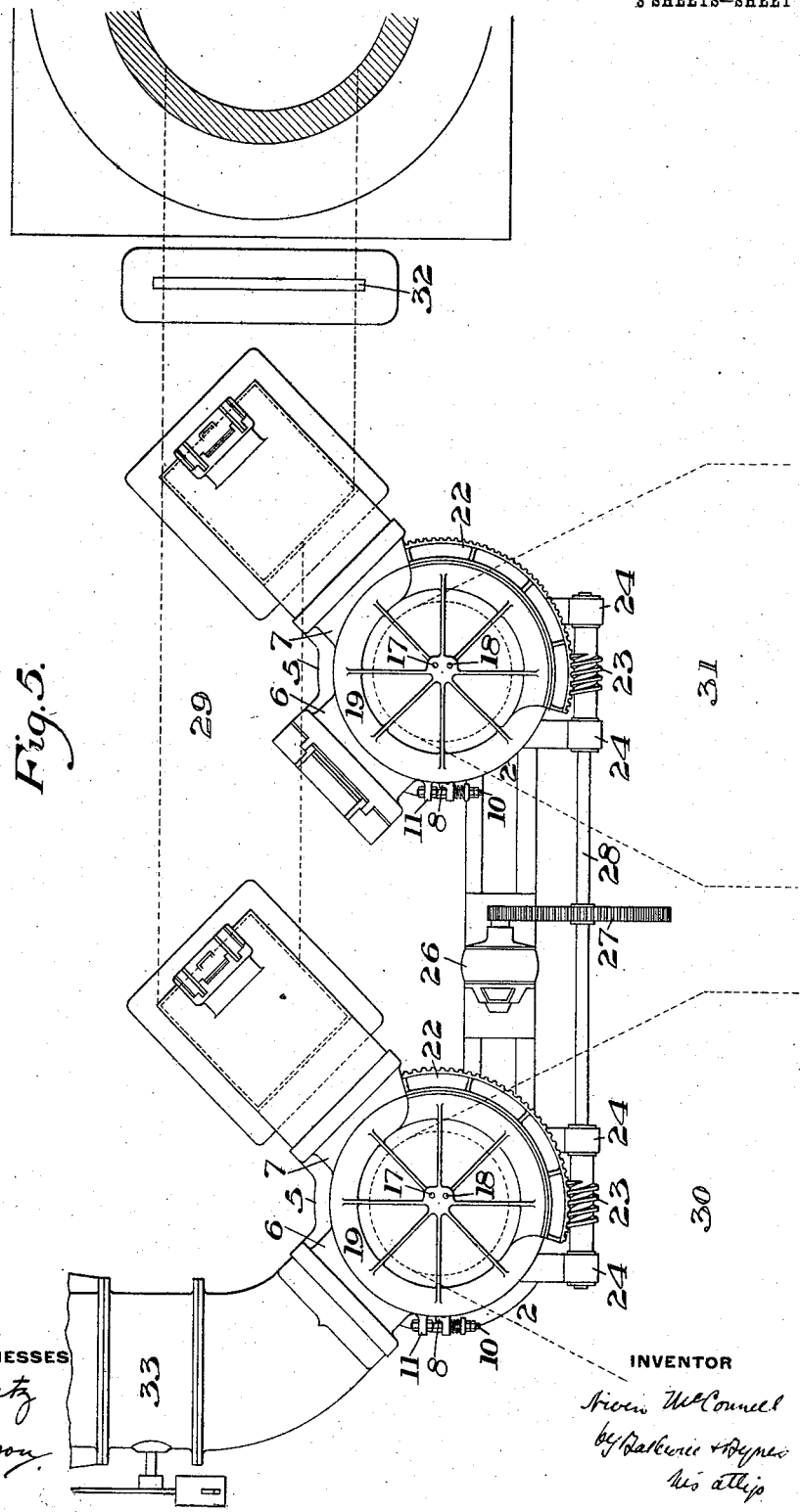

UNITED STATES PATENT OFFICE.

NIVEN McCONNELL, OF PITTSBURG, PENNSYLVANIA.

WATER-COOLED VALVE.

No. 867,289.  Specification of Letters Patent.  Patented Oct. 1, 1907.

Application filed April 20, 1907. Serial No. 369,276.

*To all whom it may concern:*

Be it known that I, NIVEN MCCONNELL, of Pittsburg, Allegheny county, Pennsylvania, have invented a new and useful Water-Cooled Valve, of which the following is a full, clear, and exact description, reference being had to the accompanying drawings, forming part of this specification, in which—

Figure 1:
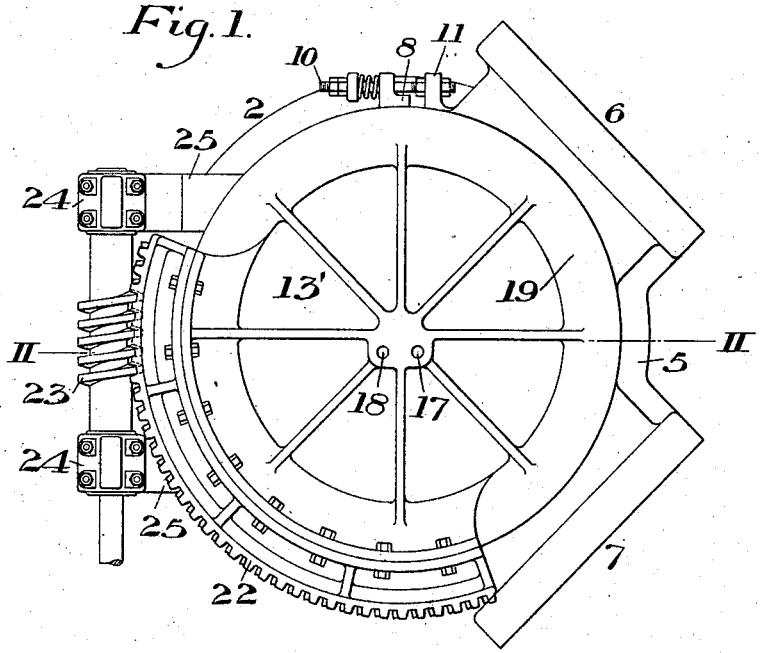
Figure 2:
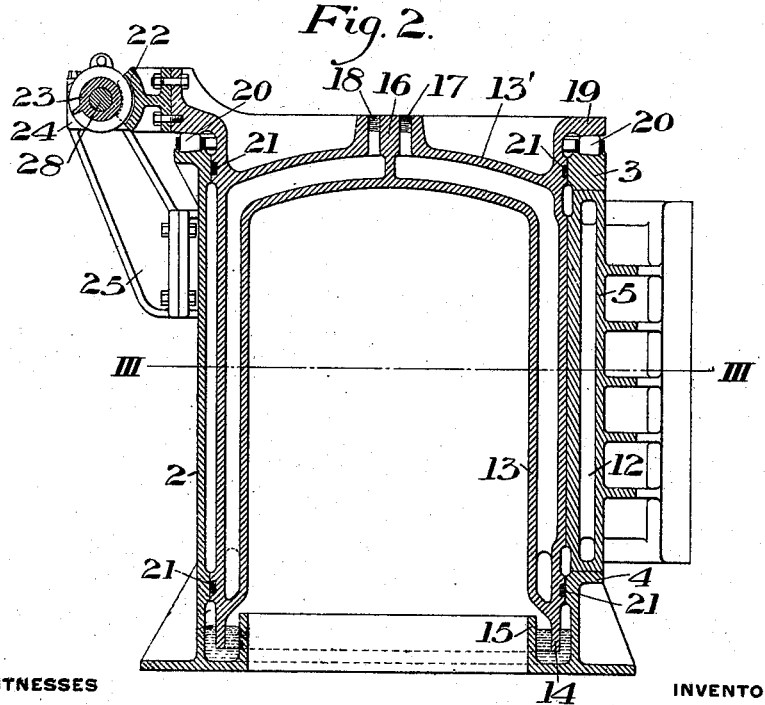
Figure 3:
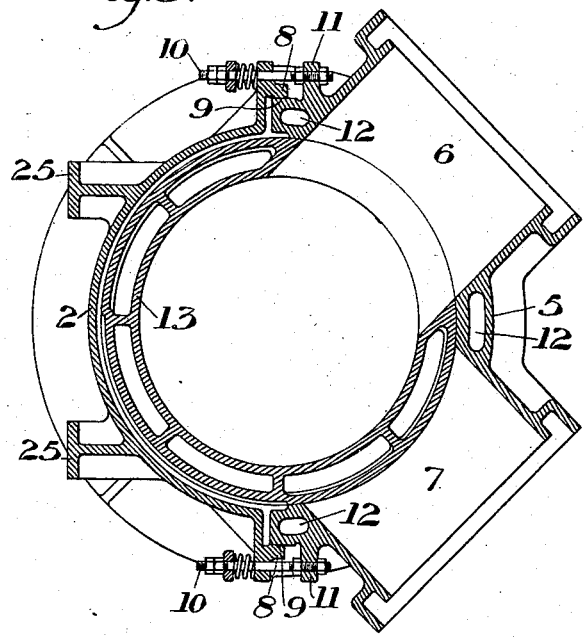
Figure 4:
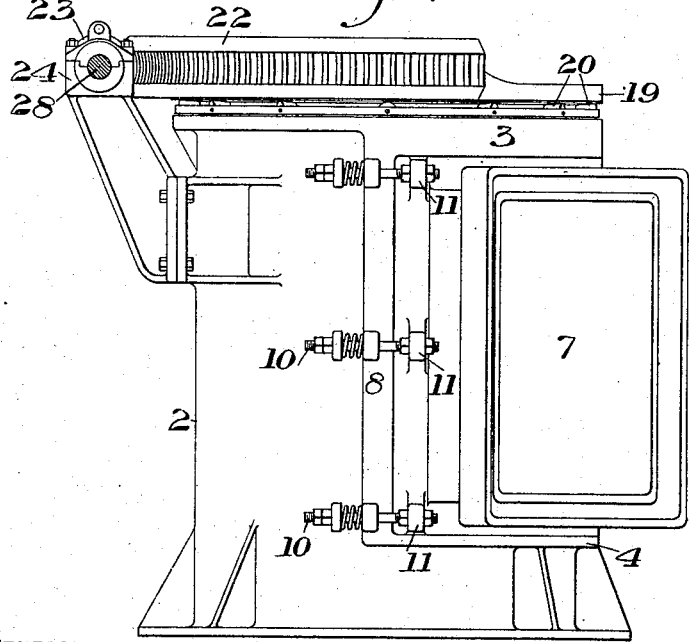

Figure 1 is a top plan view; Fig. 2 is a vertical section on the line II—II of Fig. 1; Fig. 3 is a cross-section on the line III—III of Fig. 2; Fig. 4 is a side elevation; and Fig. 5 is a plan view showing a preferred arrangement of two valves and their operating gear.

My invention relates to water-cooled valves, and is designed to improve the water-cooled reversing valve described and claimed in United States Letters Patent No. 734,081, granted to me on July 21, 1903.

The improvements relate to reducing the friction in turning the valve, to provide an efficient water-cooling system for the valve body, to prevent leakage, and improve the operating gear; also to compensate for expansion and contraction of the parts under the heat.

In the drawings, I show a cylindrical valve casing 2 having one side or half portion thereof cut away for a portion of its length, leaving top and bottom rings of annular portions 3 and 4. In this cut-away part is placed the adjustable half or port section 5 of the casing, such portion carrying the side ports 6 and 7. This portion is provided with an interfitting telescopic or sliding joint connection with the part 2 preferably by forming internal seats or flange portions 8, 8 of the part 2 against which fit the machine faces 9 on the adjustable casing member carrying the ports. The adjustable casing portion is yieldingly pressed toward the stationary casing section, preferably by spring pressed bolts 10 secured in lugs 11 on the adjustable section and passing through holes in the side flanges of the stationary section. I have shown these spring bolts arranged in sets of three, though any desirable number may be used, and any suitable means may be employed for yieldingly pressing the adjustable port section toward the stationary section. The shell of the adjustable section is preferably thickened around the ports and provided with cored-out cavities or pipes 12 which have flexible connection with water supply and exhaust pipes.

The valve body preferably consists of a hollow double walled shell or casting 13 having a closed top 13', and an open bottom. The bottom is provided with an annular lip 14 which dips into a water sealing trough 15 formed as a part of the lower ring portion 4 of the stationary casing member.

The hollow jacket formed in the valve body is provided with a double partition 16 at its top, the inlet port 17 for water being at one side of this partition, and the outlet port 18 being at the opposite side. This valve body is preferably provided at its top with an outwardly projecting suspension ring portion 19 which rests upon balls or rollers 20 carried on a circular track or ball race, formed on the ring 3 of the casing. These anti-friction members are preferably in the form of radial rollers connected to external and internal bands which hold them in proper position. The stationary portion 2 of the casing is preferably spaced apart slightly from the valve body, and the valve is provided with top and bottom expansion rings 21 which fit loosely between the valve and the top and bottom stationary rings of the casing to seal against the escape of gas or air.

To the overhanging ring portion 19 of the valve body is secured a segmental worm wheel 22 which is engaged by a worm 23 on a worm shaft mounted in bearings 24 secured to brackets 25 projecting from the stationary casing. The worm shaft 25 may be operated by any suitable connections, and I preferably arrange the valves in pairs as shown in Fig. 5. In this form an electric motor 26 is placed between the valves and has slow motion gearing connection 27 with the shaft 28 which forms a common connection between the worm shafts of the two valves. In this figure, 29 indicates the stack flue, 30 the gas flue and 31 the air flue. 32 is a damper in the stack flue, and 33 a butterfly valve which regulates the supply of gas to the valve.

The advantages of my invention result from the complete water cooling of the sides and top of the valve body, also from the arrangement of the adjustable casing member carrying the ports which is yieldingly pressed against the valve body and the expansion rings to prevent any substantial escape of gas. A further advantage results from the covered anti-friction bearing and the simple connections for operating the valve. The expansion rings between the stationary casing rings and the valve body greatly assist in retaining the gas pressure and preventing leakage.

Many variations may be made in the form and arrangement of the parts without departing from my invention.

I claim:—

1. In a reversing valve, a cylindrical casing, an oscillating valve within the casing having a side port, and a passage extending through it and in constant communication with the end port of the casing, and a separate casing member carrying side ports and yieldingly pressed against the valve; substantially as described.

2. In a reversing valve, a casing, and a turning valve therein, said valve having a closed water cooled top and water cooled sides, and separated inlet and outlet pipes arranged to circulate water through the hollow jacket at the top and sides of said valve; substantially as described.

3. In a reversing valve, a cylindrical casing and a hollow water-cooled valve therein having top and bottom expansion rings between it and the casing; substantially as described.

4. In a reversing valve, a cylindrical casing having an upper circular track, a hollow valve therein having an upper continuous projecting ring overhanging the track, and loose anti-friction members between the ring and track; substantially as described.

5. In a reversing valve, a cylindrical casing comprising a stationary casing chamber, and a yielding casing member carrying ports, a hollow rotary valve within the casing, and connections for yieldingly pressing the port section against said valve; substantially as described.

6. In a reversing valve, a cylindrical casing comprising a stationary casing member and a yielding casing member carrying ports, a hollow rotary valve within the casing, and springs arranged to force the yielding casing member toward the valve; substantially as described.

7. In a reversing valve, a casing, a jacketed rotary valve arranged to oscillate therein and having a closed jacketed top, and inlet and outlet pipes at the central portion of said top; substantially as described.

8. In a reversing valve, a cylindrical casing comprising a stationary casing member, an adjustable casing member having ports, springs arranged to press the adjustable casing member inwardly, and a hollow rotary valve in the casing having top and bottom expansion rings; substantially as described.

In testimony whereof, I have hereunto set my hand.

NIVEN McCONNELL.

Witnesses:
LAURENCE H. LEE,
H. M. CORWIN.